US008727407B2

(12) United States Patent
Parker

(10) Patent No.: US 8,727,407 B2
(45) Date of Patent: May 20, 2014

(54) APPARATUS AND METHOD FOR HOLDING A COOKIE

(75) Inventor: Herschel Parker, Midland, OH (US)

(73) Assignee: Burton & Parker Enterprises LLC, Midland, OH (US)

( * ) Notice: Subject to any disclaimer, the term of this patent is extended or adjusted under 35 U.S.C. 154(b) by 0 days.

(21) Appl. No.: 13/528,168

(22) Filed: Jun. 20, 2012

(65) Prior Publication Data
US 2012/0321775 A1 Dec. 20, 2012

Related U.S. Application Data

(60) Provisional application No. 61/498,799, filed on Jun. 20, 2011.

(51) Int. Cl.
B25B 7/00 (2006.01)
B25B 9/00 (2006.01)

(52) U.S. Cl.
USPC .............................. 294/99.2; 124/5

(58) Field of Classification Search
USPC ........ 294/99.2, 2, 219, 901, 902, 26.5; 124/5; 81/13, 488; 473/510–512, 615; 446/45–46, 266
See application file for complete search history.

(56) References Cited

U.S. PATENT DOCUMENTS

| 1,700,880 | A | * | 2/1929 | Camp | 124/5 |
| D154,865 | S | * | 8/1949 | Mellen | D22/113 |
| 3,428,036 | A | * | 2/1969 | Parker | 124/5 |
| 3,537,438 | A | * | 11/1970 | Reed | 124/5 |
| 3,589,349 | A | * | 6/1971 | Parker | 124/5 |
| 4,076,004 | A | * | 2/1978 | Huelskamp | 124/5 |

* cited by examiner

Primary Examiner — Stephen Vu
(74) Attorney, Agent, or Firm — Wood, Herron & Evans, LLP

(57) ABSTRACT

An apparatus and method for holding a cookie includes a handle and a holder configured to hold a cookie to be dipped in a beverage. The holder includes a pair of retainer panels and a generally C-shaped clip. The C-shaped clip separates the pair of retainer panels and is adapted to hold the cookie between the panels. The handle is gripped and the cookie inserted into the holder such that the C-shaped clip resiliently bends around at least a portion of the cookie. The cookie is held by the holder and may be dipped into a beverage, such as milk.

6 Claims, 2 Drawing Sheets

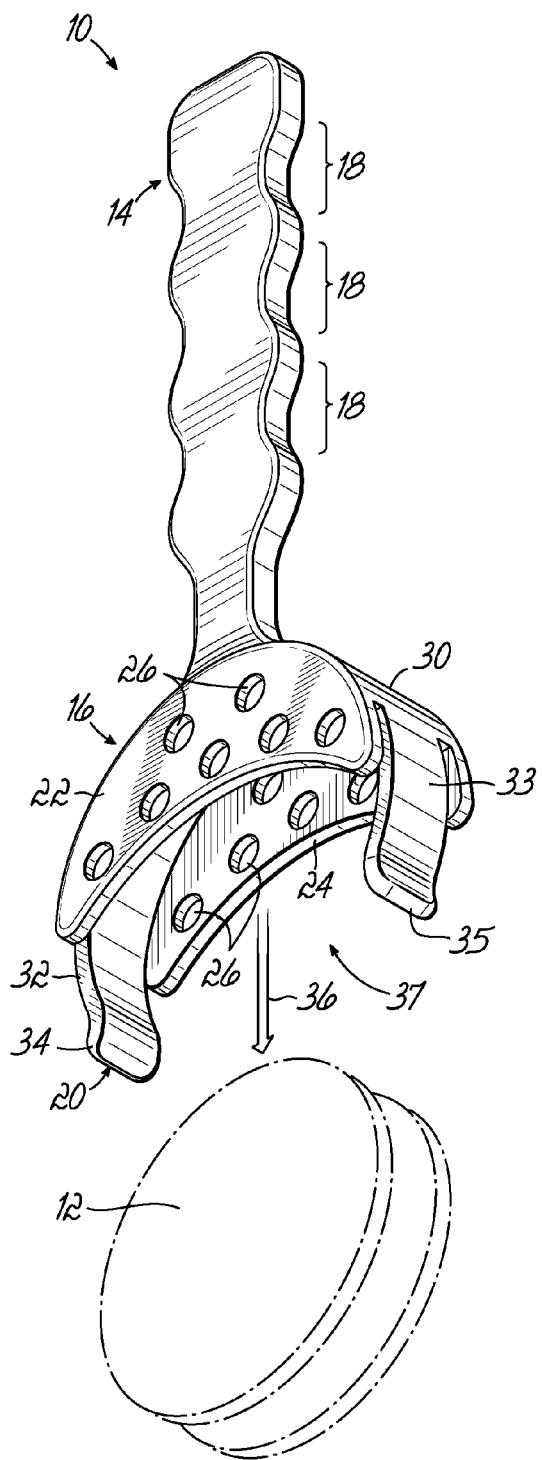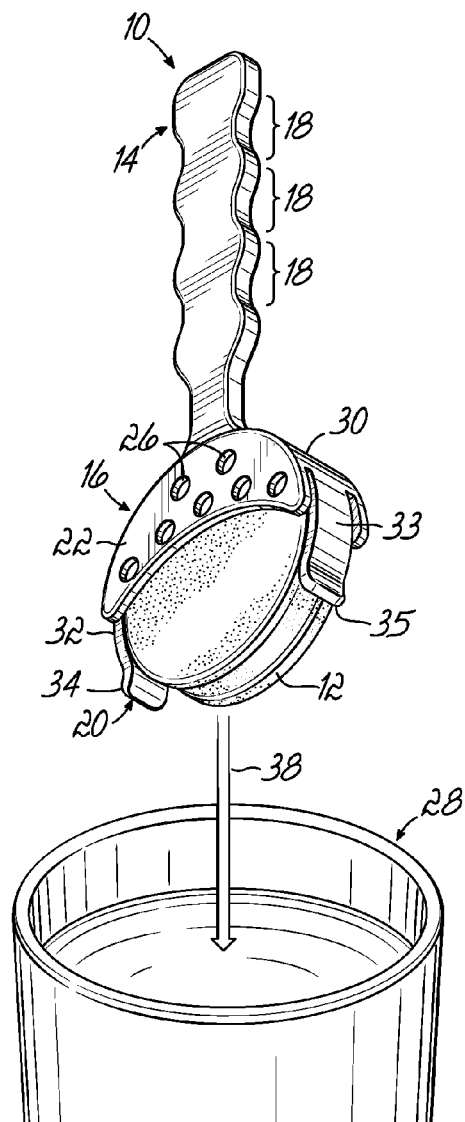
FIG. 1
FIG. 2

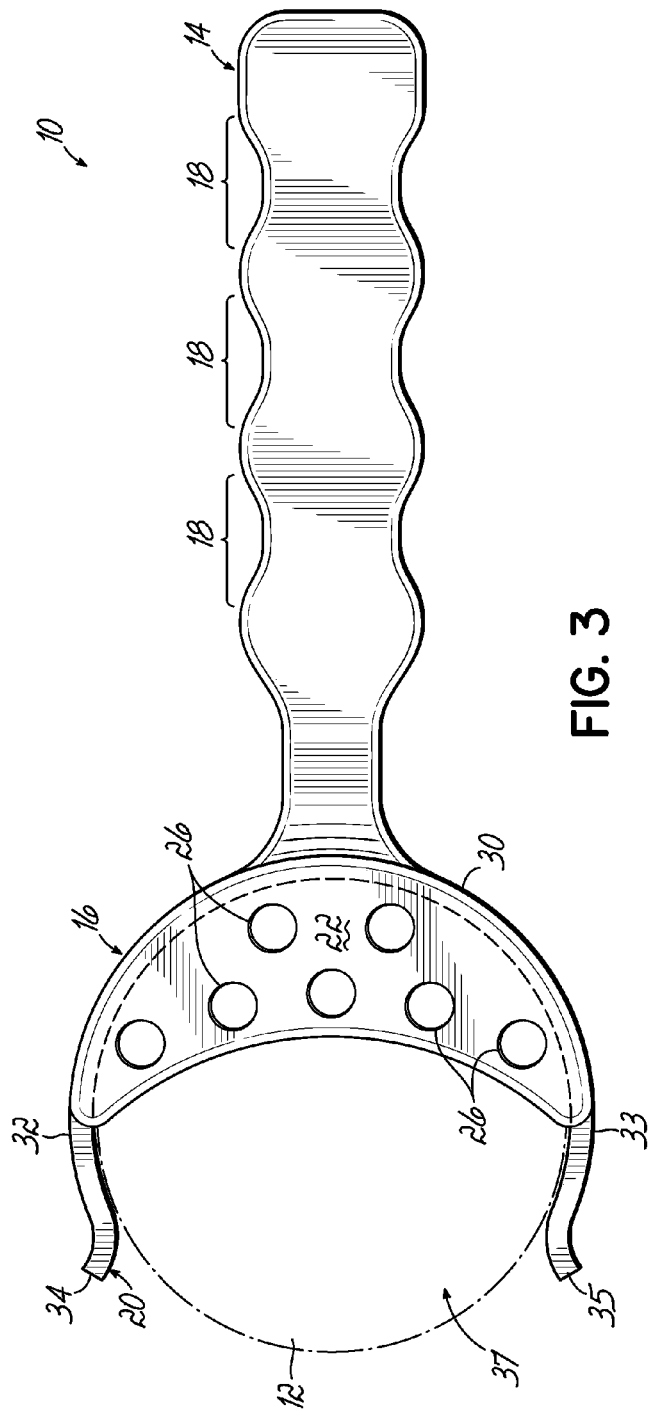
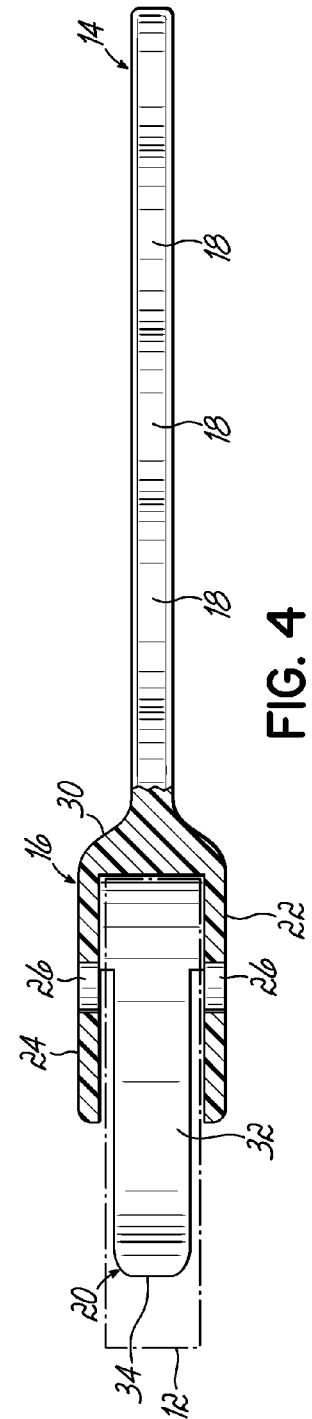
FIG. 3
FIG. 4

APPARATUS AND METHOD FOR HOLDING A COOKIE

CROSS-REFERENCE TO RELATED APPLICATIONS

This application claims the filing benefit of U.S. Provisional Patent Application Ser. No. 61/498,799 filed on Jun. 20, 2011, which is incorporated by reference herein in its entirety.

TECHNICAL FIELD

The present invention relates generally to an apparatus and method for a hand held utensil for consuming food, and more particularly, to a hand held retainer for consuming cookies.

BACKGROUND

Cookies may be consumed, or otherwise eaten, in any variety of ways. However, dipping cookies in a beverage, such as milk, is a particular favorite of the consuming public. Quite literally, generations of people have been satisfying their sweet tooth by reaching into a cookie container or package with one hand while reaching for a cold glass of milk with the other. Once in hand, the resulting consumption could be as unique as the people themselves.

Similarly well known are the unsavory consequences of both handling the cookie and dipping it into the beverage for consumption. Particles of the cookie, such as crumbs, routinely transfer from the cookie to the hands of the consumer. Once the crumbs stick to the hand, the consumer may inadvertently transfer the crumbs from the hand to clothing, body, or other areas of the surrounding environment preferably kept free of crumbs. In addition, dipping the cookie in the beverage often requires the consumer to physically dip the hand grasping the cookie into the beverage. While this favorably soaks the cookie, the consumer may undesirably drip, or otherwise spread, the milk to clothing, body, or other areas of the surrounding environment. Thus, the mess and resulting cleanup associated with eating a cookie deters many consumers from engaging in this otherwise popular activity.

Moreover, some consumers physically lack the dexterity to manipulate a cookie from the package, into the glass, and to the mouth in order to eat the cookie. Such a lack of required dexterity may be the result of either youth or physical handicap. In either case, these consumers are often physically unable to satisfy their desire for cookies and milk without the assistance of another person.

There is a need for an apparatus and method for consuming cookies, such as dipping cream filled cookies into a beverage for consumption, that addresses present challenges and characteristics such as those discussed above.

SUMMARY

In an embodiment, the invention provides a handle and a holder attached to the handle for holding a cookie to be dipped in a beverage. The holder generally includes a first side retainer panel, a second side retainer panel, and a generally C-shaped clip. The C-shaped clip and the first and second retainer panels are adapted to hold the cookie between the panels so that the cookie may be dipped in the beverage.

In one aspect, the C-shaped clip includes a tab portion and an end portion. The tab portion is configured to resiliently bend outward to receive the cookie and recoil inward to hold the cookie. The end portion is flared outward relative to the tab portion and is configured to direct the tab portion outward to hold the cookie.

In another embodiment, the apparatus for holding the cookie to be dipped in the beverage is used by gripping the handle with a hand and inserting the cookie into an opening of the holder. Furthermore, the C-shaped clip is resiliently bent around at least a portion of the cookie so that the cookie is held between the first and second retainer panels.

Various additional objectives, advantages, and features of the invention will be appreciated from a review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 1 is a perspective view of a cookie being inserted into an apparatus for holding a cookie.

FIG. 2 is a perspective view of the cookie and apparatus of FIG. 1 being dipped in a beverage.

FIG. 3 is a top view of the apparatus of FIG. 1.

FIG. 4 is a side view of the apparatus of FIG. 1.

DETAILED DESCRIPTION

With reference to FIGS. 1-4, an embodiment of the apparatus 10 for holding a cookie 12 includes a handle 14 and a holder 16. The handle 14 is affixed to the holder 16 such that the handle 14 and holder 16 are formed, or otherwise integrated, together from a single piece of material. According to a preferred embodiment, the single piece of material is a plastic, such as polypropylene. However, it will be appreciated that the handle 14 and holder 16 may be assembled from any number of materials, components, or manufacturing processes.

The handle 14 is ergonomically configured and includes a plurality of grooves 18 which provide comfortable positions into which a hand, and specifically fingers, may rest while gripping the handle 14. To generally fit the hand of a wide variety of individuals, the handle 14 is sized approximately 60 millimeters to 100 millimeters in length. By sizing the handle appropriately with the plurality of grooves 18, the handle 14 is generally adapted to be gripped with more friction and force applied by the hand. Such grip may be of particular benefit to young children and individuals having a physical handicap by providing additional ability to grip, and thus manipulate, the handle 14. As shown, the plurality of grooves 18 is positioned along the length of two edges of the handle 14. It will be appreciated; however, that any features for gripping the handle may be so used.

The holder 16 is generally configured to hold the cookie 12 as shown in FIG. 2. With reference to FIGS. 1-4, the holder 16 includes a C-shaped clip 20 and a first and second side retainer panels 22, 24. As shown, the C-shaped clip 20 and the first and second side retainer panels 22, 24 are integrated; however, in the alternative, each may be separately manufactured and assembled to form the holder 16. The C-shaped clip 20 is positioned such that the first side retainer panel 22 is separated from the second side retainer panel 24 by the C-shaped clip 20. More specifically, the C-shaped clip 20 is sandwiched between the first and second C-shaped clip 20.

With respect to the first and second retainer panels 22, 24, each of the panels 22, 24 is generally planar and semicircular in shape. Moreover, each of the panels 22, 24 include a plurality of apertures 26. Thereby, the first and second retainer panels 22, 24 are configured to receive, capture, and hold the cookie while manipulating the device 10 from a package (not shown) and into a beverage 28, as shown in more detail in FIG. 2. In addition, the plurality of apertures 26 is adapted so that the beverage may more easily reach the entirety of the cookie being held by the holder 16.

In addition to the first and second panels 22, 24, the C-shaped clip is further adapted to receive, capture, and hold the cookie 12. More particularly, the C-shaped clip includes a base portion 30, first and second tab portions 32, 33 and first and second end portions 34, 35.

With reference to FIG. 3, the handle 14 is attached to the holder 16 at the base portion 30. The tab portions 32, 33 are affixed to the base portion 30 and extend from the base portion 30 forward of the first and second retainer panels 22, 24. Extending forward further, the C-shaped clip 20 terminates at the end portions 34, 35. Generally, the base portion 30 and tab portions 32, 33 are C-shaped with the end portions 34, 35 flared outward from the tab portion 32. It will be appreciated that multiple configurations of the C-shaped clip may be used in order to hold the cookie as described herein.

The tab portions 32, 33 and end portions 34, 35 are configured to resiliently bend outward in order to receive the cookie 12. Once the cookie 12 is received, the tab portions 32, 33 and end portions 34, 35 recoil to bias the cookie 12 against the base portion 20 and between the first and second retaining panels 22, 24. Thereby, the holder 16 operatively holds the cookie 12. Furthermore, the end portions 34, 35 are flared outward in order to further direct the tabs 32, 33 around at least a portion of the cookie 12.

In addition, the C-shaped clip 20 and the first and second retaining panels 22, 24 define an opening 37 adapted to receive the cookie 12. More specifically, the opening 37 has an approximate width between 7 millimeters and 12 millimeters and an approximate unbiased length of between 42 millimeters and 47 millimeters.

In order to use the apparatus 10 for holding the cookie 12, the consumer grips the handle 12 by hand so that the consumer may manipulate the apparatus 10. The cookie 12 is forcibly inserted into the opening 37, as indicated by arrow 36, such that the end portions 34, 35 directs the tabs 32, 33 around at least a portion of the cookie. With the cookie 12 fully inserted into the opening 37, the cookie is biased against the base portion 20 and further held by the retaining panels 22, 24.

The consumer further manipulates the apparatus 10 via the handle 14 by dipping the cookie 12 and holder 16 into the beverage 28 such that the hand gripping the handle 14 remains separate from the beverage 28, as indicated by arrow 38 in FIG. 2. With the hand free of the beverage 28, the consumer submerges the entire cookie and may fully soak the beverage, preferably milk, into the cookie. Finally, the consumer manipulates the apparatus 10 holding the cookie 12 to the consumer's mouth for consumption.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be from such details without departing from the scope or spirit of the general inventive concept.

What is claimed is:

1. An apparatus for holding a cookie, which allows the cookie to be dipped in a beverage, comprising;
   a handle; and
   a holder attached to said handle, said holder including first and second spaced parallel side retainer panels and a generally C-shaped clip, the C-shaped clip having a base portion at said handle and first and second tab portions extending arcuately from said base portion and beyond outer edges of said retainer panels to first and second edges;
   said tab portions separate from said retainer panels whereby said tab portions may resiliently bend outward to receive a cookie;
   wherein said side retainer panels are fixed to said base portion and extend outward from said handle and between said first and second tab portions;
   wherein said C-shaped clip separates said panels and is adapted to hold the cookie between said panels.

2. The apparatus of claim 1 wherein said C-shaped clip further includes an end portion, said end portion flared outward relative to said tab portion and configured to direct said tab portion outward to hold the cookie.

3. The apparatus of claim 1 wherein said first and second spaced parallel side retainers include an aperture.

4. The apparatus of claim 1 wherein said handle includes a plurality of grooves being configured for handheld grip.

5. The apparatus of claim 1 wherein said C-shaped clip and said first and second spaced parallel side retainer define an opening, said opening adapted to receive a cookie.

6. The apparatus of claim 5 wherein said opening has a width between 7 millimeters and 12 millimeters and an unbiased length between 42 millimeters and 47 millimeters.

* * * * *